3,450,540
PROCESS FOR PREPARING A PROTEIN-
FORTIFIED CEREAL PRODUCT
Robert P. Graham, El Cerrito, Marcus R. Hart, Concord, and Arthur I. Morgan, Jr., Berkeley, Calif., assignors to the United States of America as represented by the Secretary of Agriculture
No Drawing. Filed Aug. 9, 1966, Ser. No. 571,684
Int. Cl. A23l 1/10, 1/30
U.S. Cl. 99—83         5 Claims

ABSTRACT OF THE DISCLOSURE

Cereals such as wheat are fortified by the following technique: The wheat is moistened; coated with a proteinous material in powder form; steamed to consolidate the coating and adhere it to the wheat; and toasted in a current of hot air to further increase the adherence of the coating.

---

This invention relates to and has among its objects the provision of new foods, in particular, cereal products which are fortified with proteins. The objects of the invention also include the provision of novel procedures for preparing the said food products. Further objects of the invention will be evident from the following description wherein parts and percentages are by weight unless otherwise specified.

It is recognized that there are serious food shortages in many parts of the world, particularly in India and the Far East. On the other hand, there is a large surplus of wheat in the United States. In recent years, large amounts of this surplus wheat have been exported to the food-deficient areas to alleviate the problem. People in the areas in question are accustomed to a diet of rice and for this reason the wheat prior to export is converted into products which resemble rice and which have culinary uses similar to those of rice. Typical among these products are bulgur, i.e., dry parboiled wheat, and the recently-developed precooked, peeled wheat products described in the patent application of Barta, Kilpatrick, and Morgan, Ser. No. 336,603, filed Jan. 8, 1964, now Patent 3,264,113, and which have come to be known as WURLD wheat.

However, nutritionists do not regard wheat products as a complete answer to mass feeding programs because their protein content is only about 10–12%. Thus nutritionists advocate that a single food for mass feeding should contain a higher protein content—on the order of 20%—whereby it may serve as a balanced source of carbohydrate and protein nutrients. Another item is that wheat products are relatively deficient in one of the essential amino acids—lysine. It is further advocated that for proper nutritive value it is desirable to increase the amount of lysine in the wheat products.

By application of this invention one is enabled to prepare wheat products which are protein-fortified and which obviate the problems described above.

One modification of the invention concerns a product in which wheat, or other cereal, is coated with an adherent envelope of proteinous material. The production of this new foodstuff is described in detail as follows:

(I) The cereal—wheat, for instance—is first moistened. This is preferably done by soaking it in water until the moisture content of the grain is about 20%. The time required to reach this goal will vary, particularly on the size and condition of the grain. Thus, longer time of soaking will be required for grains in a whole condition than those in a cracked condition. Also, products with the bran retained will require a longer soak than those with the bran removed. In typical operations with whole raw wheat or gelatinized whole-kernel wheat, the soaking time is about 10 minutes; with cracked wheat products the soaking time may be as short as 15–20 seconds. Usually for convenience, the soaking is done in water at about room temperature (75° F.). Although the moistening is preferably accomplished by soaking, it is evident that other techniques can be used, such as spraying the water on the grain as it is tumbled in a drum or otherwise agitated to expose the surfaces thereof to the water spray. In any event, after application of water, the grain is drained and while still wet is subjected to the next step of the procedure. This moistening step also provides a convenient time at which to absorb water-soluble supplements into the grain. Thus, one may add to the moistening water such substances as water-soluble vitamins (thiamin, riboflavin, ascorbic acid, etc.) and/or mineral salts, such as calcium chloride, whereby these substances will be absorbed by the grain and the product will be thus enriched in these factors.

(II) The moistened wheat is coated by tumbling it with the proteinous additive, this latter being in a powder form. The tumbling is readily achieved by placing the moistened wheat and protein powder in a drum and rotating the drum to cause the powder to uniformly coat the grains. The wet condition of the grains is important as enabling the powder to stick to the grains. The relative proportion of grain and protein powder may be varied depending on what degree of protein fortification is desired for the final product and depending on the protein content of the powder to be applied. Considering these variables, the proportions may range from about 5 to about 50 parts of protein powder per 100 parts of the grain. In typical operations where the protein is soybean flour, for example, a preferred ratio is about 15 to 25 parts thereof per 100 parts of wheat. At the completion of the tumbling operation, the product consists of wheat grains coated with the protein powder. However, at this point the coating is not durable and will readily slough off by rubbing action. Accordingly, further treatment is required to stabilize the coating.

(III) In this step the coated grain is subjected to steaming. This is conventionally done in an ordinary food blancher. The coated grain is placed on metal screens and passed through the device wherein it is exposed to live steam (at about 212° F.). This steaming is continued for a period of about 2 to 5 minutes, depending on the depth of the grain on the screens. A thinner bed of grain will be heated quicker and hence will require a shorter sojourn in the blancher than will a thicker bed of grain. If desired, the grain may be subjected to shaking or vibrating while being steamed but this is not essential. The steaming operation provides several important results. For one thing, it causes a setting or consolidation of the coating—i.e., it consolidates the individual particles of protein in the coating into a homogeneous material. It also adheres the coating to the grain so that the tendency of the coating to rub off is greatly diminished. Also, the seaming has the effect of decreasing the flavor of the added protein. This is important, for example, where the protein is soybean flour which naturally has a rather undesirable "beany" flavor. The steaming markedly suppresses this beany flavor so that it does not detract from the desired taste of the grain itself. Another item is that the steaming destroys substances—such as antitrypsin or other enzyme inhibitors—which may be naturally present in the added protein and which substances interfere with digestion of the protein. It is thus evident that the steaming accomplishes valuable results. However, at this point the coating is not stable to cooking. If the product is cooked—as by boiling in water—at least part of the coating will slough off with the result that the product has an undesirable mealy texture. Accordingly, in a next step the product is toasted to stabilize the coating to the end that the product can be cooked with retention of the coating.

(IV) The toasting can be readily accomplished in a device which includes a treating chamber provided with a top and bottom—both of screening or perforated metal. Also provided is a duct for directing a draft of hot air upwardly through the chamber. In operation, the coated grain, still moist from the previous steaming, is placed in the chamber wherein it is tumbled about and suspended in the stream of hot air (about 300–400° F., preferably 350° F.) passing through the chamber. Usually, the exposure to the hot air current is continued for about 1 to 2 minutes depending on the size of the grains. In any event, the time of treatment should not be so extended as to cause the grains to be excessively brown. In the preferred treatment, the toasting operation is discontinued when the grains assume a light tan color. As previously noted, this toasting operation has the desirable result of stabilizing the coating so it is retained even when the product is cooked. Moreover, the toasting further eliminates the beany flavor of the protein and gives the product a very desirable nutty flavor.

(V) (Optional) If the product after toasting is not dry enough for keeping, it is subjected to a conventional drying step, for example, by contacting it with warm air (about 150° F.) until its moisture content is about 10 to 14%.

By applying the procedure described above, one obtains cereal particles each enveloped with an abrasion-resistant coating of the proteinous material. This product constitutes a valuable food as it contains the carbohydrates, proteins, and vitamins of the cereal plus the added protein of the coating. This protein may be one, the composition of which complements the composition of the cereal protein so as to result in a higher quality mixture than that of either protein alone. The products are not only valuable nutritionally but have an attractive appearance as the coating is smooth and covers the grain uniformly. Also, the products have an attractive light tan color. A further item is that the individual coated grains are not sticky but remain separate on storage and can be readily dispensed from containers by pouring just as can be, say, raw wheat. The adventitious rubbing of the grains against one another in packaging, shipping, etc. does not detach the coating. Thus the coating may well be described as rugged and abrasion-resistant. The coating does not interfere in any way with cooking of the products—they are cooked in the same way as the uncoated grain would be cooked. For example, if the grain is in a precooked condition prior to coating, the products would be heated in boiling water about 10–15 minutes. A somewhat longer time would be used if the grain were not precooked. In any case, the coating remains on the grain during the cooking so the consumer has the benefit of the protein fortification as he consumes the grain. Another item is that the products form a dish of excellent nutty flavor even in cases where the protein supplement is derived from soybeans, which normally impart an undesirable beany taste to food products.

In the foregoing description, we have stressed application of our invention to wheat. However, the invention is not limited to this particular commodity and may be applied to other cereals, for example, rice, oats, barley, corn, rye, sesame, milo, etc. The cereal used as the starting material for the coating operation may be in a condition retaining the bran, it may be partly or completely debranned, it may retain the germ or may be partly or completely degermed. Moreover, the cereal may be in a raw or precooked state and it may be in the form of whole kernels or cracked into kernel fragments. The expression "particle" and variants thereof are used herein as generic to cereals in whole-kernel or cracked form. In the preferred embodiments of the invention the cereal is any one of the chemically-peeled wheat products (precooked or uncooked) as described in the copending application of Barta, Kilpatrick, and Morgan, Ser. No. 336,603, filed Jan. 8, 1964, now Patent 3,264,113. Methods for preparing these peeled wheat products on a continuous basis are disclosed in the copending application of Graham, Barta, and Morgan, Ser. No. 520,273, filed Jan. 12, 1966, now Patent 3,358,723. Another useful form of cereal for coating is the mechanically-peeled wheat described by Copley, Ferrel, and Pence in U.S. Patent 3,228,771, Jan. 11, 1966. Also useful is bulgur, which may be prepared, preferably, by the technique of Smith, Barta, and Lazar, U.S. Patent 3,132,948, May 12, 1964.

The protein powder used for the coating is preferably low-fat soybean flour since it has a high protein content—about 50%—and is low in price and readily available on the market. Also, it contains a substantial proportion of lysine and thus remedies the deficiency of this amino acid in wheat. The material is referred to as "low-fat" since it is prepared from soybeans which have been defatted by solvent extraction or equivalent procedures. Other protein materials which may be used are: defatted fish flour; casein; gluten and other proteins or protein concentrates derived from wheat; zinc; nonfat milk solids; and flours prepared from beans of the genus phaseolus, i.e., lima beans, navy beans, etc.

The invention is further demonstrated by the following illustrative examples:

Example 1

Five hundred grams of precooked, peeled wheat was placed in a perforated metal basket and immersed in a tank of cold water for about 10 minutes. The basket was then removed from the tank and swung vigorously several times to drain the wheat.

The moistened wheat was then poured into a drum together with 125 grams of low-fat soybean flour. The drum was closed, shaken several times to mix the contents, then rolled for about 4½ min. to coat the flour uniformly on the wheat grains.

The drum was then opened and the coated grain spread on a screen which was placed in a conventional food blancher wherein the grain was contacted with steam (212° F.) for 2 minutes.

The steamed coated grain was then introduced into a toasting device. This piece of equipment includes a receptacle having a screened top and bottom, and means for directing a stream of hot air upwardly through the receptacle at a velocity high enough to suspend and tumble about the grain contained therein. In this instance the grain was contacted with the hot air stream (350°) for 1.75 minutes.

The toasted grain was then placed in a conventional dehydrator where it was contacted with warm (140° F.) air until its moisture content was about 12%.

The product was observed to consist of light tan-colored, oval particles of uniform size. Its protein content was 20%. The coating was smooth and strongly adherent. If the product was subjected to cracking forces, the coating was not separated: The entire grains broke and the pieces still retained their proportion of adherent coating. A sample of the product was simmered in an equal volume of water for about 15 minutes and examined and tasted. It was found that the grains remained separate, the coating was retained on the grains, and the product had an excellent nutty flavor—no bean flavor could be detected.

Preparation of starting material

The precooked, peeled wheat used as a base for the coating described above in Example 1 was prepared by the technique described in the application of Graham, Barta, and Morgan, Ser. No. 520,273, filed Jan. 12, 1966, now Patent 3,358,723, namely:

(a) Soaking.—Raw wheat was fed at the rate of 250 lbs./min. into a trough, U-shaped in cross-section, provided with a screw, and filled with hot water. Heating jackets were provided to maintain the mixture at 135° F. at the feed end, 180° F. at the exit end. The time of sojourn of the wheat in the trough was one hour.

(b) Tempering.—The soaked wheat was fed through a bin wherein it was held at 180° F. Sojourn time was 30 minutes.

(c) Cooking.—The soaked and tempered wheat was passed through a reel wherein it was contacted with steam (212° F.) for 12 minutes (to gelatinize the starch in the grains).

(d) Lye treatment.—The cooked wheat, still in the reel was sprayed with hot (about 180° F.), 25% aqueous NaOH, using an amount of the solution equal to 20% the weight of the wheat. The lye-coated wheat was held in the reel 3 minutes while steam was applied to it to keep it hot (about 180° F.). The lye-treated wheat was then rinsed on a rotating screen with cold water to quench it and remove at least part of the NaOH.

(e) Peeling.—The lye-treated wheat was slurried with excess water and the slurry was pumped under 40 lbs./sq. in. pressure and at a rate of 25 gal./min. through a hydrocyclone. This device had a diameter (at the top) of 3" and a length of 24". The discharge tip had a diameter of ¼", the inlet and outlet were standard ½" pipe. Pressure drop through the device was 40 lbs./sq. in. The peeled grain issuing from the discharge tip was washed thoroughly with water, using counterflow through a trough equipped with a screw conveyor.

(f) Acid treatment.—The washed, peeled grain was passed through another trough equipped with a screw conveyor wherein it was contacted with 1% aqueous acetic acid at 120° F. for 5 minutes. In running this step, about 1 lb. of acid per 100 lbs. of grain was metered into the trough to make up for the acid neutralized by the alkali in the grain. The acid-treated grain was then washed with water on a screen.

(g) Drying.—The grain, which at this point contained about 50% H₂O was dried. Drying was in a belt-trough dryer wherein a gently-mixing bed of the grain was contacted with a stream of warm air. Other types of dryers such as rotary kilns, tunnel dryers, etc. can, of course, be used. In any case, the drying is continued until the grain contains 10–14% moisture. Yield of the product, which has been named WURLD wheat, was 85 lbs. per 100 lbs. of raw wheat. Properties of the product are listed below:

| | |
|---|---|
| Color | Yellow-white |
| Colored bran content _____percent__ | 0 |
| Cooking time _____min__ | 15 |
| Density _____lbs./bu__ | 40 |
| Protein _____percent__ | 11 |
| Fat _____do____ | 1.0 |
| Thiamine _____mg. per 100 g__ | 0.12 |
| Riboflavin _____do____ | 0.10 |
| Germ _____ | Absent |

Another phase of the invention concerns a flaked product of cereal and the protein-fortifying material. This is a product especially adapted for feeding of infants and its production is described in detail below.

In preparing the flaked product, a selected cereal such as any of those exemplified hereinabove is subjected to the steps of moistening, tumbling with the protein additive, and steaming, all as described above in paragraphs I through III. The coated product, while still warm from the steaming, is then pressed between rolls (preferably heated to about 200–225° F.) to form flakes of a thickness of about 5 to 20 thousandths of an inch. Optionally, the flakes may be then toasted as described above in paragraph IV. Ordinarily, the flakes so produced have a low moisture so that they will keep safely without spoilage. If, however, it is necessary to further dry them this can be done in conventional manner as by contacting them with warm (about 150° F.) air. Usually, a final moisture content of about 10–14% is preferred.

This phase of the invention is further demonstrated by the following example:

Example 2

Raw, cracked wheat (100 parts) was placed in a perforated metal basket and immersed in a tank of cold water for about ¼ minute. The basket was then removed from the tank and swung vigorously several times to drain the wheat.

The moistened wheat was poured into a drum together with low-fat soybean flour (25 parts). The drum was closed, shaken several times, then rolled for about 1½ minutes to coat the flour uniformly on the cracked kernels.

The drum was then opened and the coated material spread on a screen which was placed in a food blancher where it was contacted with steam (212° F.) for about 1.5 minutes.

The steamed material, while still hot, was fed into the nip between two rotating rolls maintained at 225° F. The distance between the rolls was adjusted to press the coated particles into flakes about 0.010 inch thick. It was observed that the soybean material adhered strongly to each flake so that it did not slough off when the flages were subjected to rubbing action. Protein content of the product was 20% (original wheat 12%). A sample of the product was cooked by adding an amount of boiling water to cover the flakes and boiling for 2 minutes. This produced a mush-like dish eminently suitable for infant feeding and which had an excellent flavor in which the beany flavor of soybeans could not be detected.

Having thus described the invention, what is claimed is:

1. A process for coating particulate cereal material which comprises:
    (A) soaking cereal particles in water until their moisture content is about 20%,
    (B) tumbling the moistened cereal particles with a proteinous material in powder form to provide them with a coating of the proteinous material,
    (C) steaming the coated cereal particles to consolidate the coating and adhere it to the cereal particles, and
    (D) toasting the steamed coated particles in a current of hot air to further increase the adherence of the coating.

2. The process of claim 1 wherein the proteinous material is low-fat soybean flour.

3. The process of claim 1 wherein the cereal is wheat.

4. The process of claim 1 wherein the proteinous material is low-fat soybean flour and the cereal is precooked, peeled wheat.

5. A process for preparing a protein-fortified cereal product which comprises:
    (A) soaking cereal particles in water until their moisture content is about 20%,
    (B) tumbling the moistened cereal particles with a proteinous material in powder form to provide them with a coating of the proteinous material,
    (C) steaming the coated particles to consolidate the coating and adhere it to the cereal particles, and (D) rolling the steamed coated particles, while still hot, to form flakes.

References Cited
UNITED STATES PATENTS

| | | | |
|---|---|---|---|
| 2,436,519 | 2/1948 | Luke | 99—83 |
| 2,508,477 | 5/1950 | Stievater et al. | 99—11 |
| 2,526,792 | 10/1950 | Wells | 99—81 |
| 2,775,521 | 12/1956 | Mateles et al. | 99—11 |
| 2,836,495 | 5/1958 | Thompson | 99—81 |
| 2,952,543 | 9/1960 | Szczesniak et al. | 99—14 |

RAYMOND N. JONES, *Primary Examiner.*

U.S. Cl. X.R.

99—11, 14